(12) United States Patent
Gadanho et al.

(10) Patent No.: US 8,037,011 B2
(45) Date of Patent: Oct. 11, 2011

(54) METHOD AND APPARATUS FOR RECOMMENDING CONTENT ITEMS

(75) Inventors: Sandra C. Gadanho, Reading (GB); Nicolas Lhuiller, Versailles (FR); Kevin C. Mercer, East Challow (GB)

(73) Assignee: Motorola Mobility, Inc., Libertyville, IL (US)

( * ) Notice: Subject to any disclaimer, the term of this patent is extended or adjusted under 35 U.S.C. 154(b) by 650 days.

(21) Appl. No.: 12/210,359

(22) Filed: Sep. 15, 2008

(65) Prior Publication Data

US 2010/0070436 A1   Mar. 18, 2010

(51) Int. Cl.
*G06F 15/00* (2006.01)
*G06F 15/18* (2006.01)

(52) U.S. Cl. ............ 706/62; 706/45; 706/46; 706/47; 706/52

(58) Field of Classification Search .............. None
See application file for complete search history.

(56) References Cited

U.S. PATENT DOCUMENTS

| | | | |
|---|---|---|---|
| 2001/0028603 A1* | 10/2001 | Shimazu | 368/10 |
| 2002/0054062 A1* | 5/2002 | Gerba et al. | 345/716 |
| 2004/0068741 A1 | 4/2004 | Kimura | |
| 2005/0022239 A1 | 1/2005 | Meuleman | |
| 2005/0076365 A1 | 4/2005 | Popov et al. | |
| 2005/0193002 A1* | 9/2005 | Souders et al. | 707/103 X |
| 2006/0047678 A1* | 3/2006 | Miyazaki et al. | 707/102 |
| 2006/0212904 A1 | 9/2006 | Klarfeld et al. | |
| 2008/0082633 A1* | 4/2008 | Koyama et al. | 709/219 |
| 2008/0250312 A1* | 10/2008 | Curtis | 715/700 |
| 2009/0222392 A1* | 9/2009 | Martin et al. | 706/46 |

FOREIGN PATENT DOCUMENTS

| | | |
|---|---|---|
| JP | 2000-269840 A | 9/2000 |
| WO | WO2002/025938 A2 | 3/2002 |
| WO | WO 2002-037851 A2 | 5/2002 |
| WO | WO 2004-002129 A2 | 12/2004 |

OTHER PUBLICATIONS

Sung Woo Park, "Corresponding Application PCT/US2009/052537—PCT International Search Report and Written Opinion," WIPO, ISA/KR, Korean Intellectual Property Office, Daejeon, Republic of Korea, Mar. 16, 2010, 10 pages, most relevant pp. 6-7 and 10.

S. Gadanho, "TV Recommendations based on Implicit Information," Proceedings of the 17th European Conference on Artificial intelligence (ECAI 2006) Workshop on Recommender Systems, Riva del Garda, Italy, Aug. 28-29, 2006, 3 pages.

(Continued)

*Primary Examiner* — Omar Fernandez Rivas (57) ABSTRACT

A recommendation apparatus comprises a monitoring processor which monitors the presentation of content items. A sample processor determines preference data for different content items by performing the steps of determining a preference value for a content item presented by the presentation unit in response to a first duration for a first section of the content item being presented relative to a total duration of the content item, and if the first duration is less than the total duration, determining if a second section of the content item not being presented corresponds to at least one of an end section and a begin section of the content item; and if so determining a confidence value for the preference value in response to a second duration of the second section. The preference data is used as training data for determining a user preference model which is then used to generate recommendations.

20 Claims, 4 Drawing Sheets

OTHER PUBLICATIONS

S. Gadanho, et al, "Addressing Uncertainty in Implicit Preferences," Proceedings of the 2007 ACM Conference on Recommender Systems, Minneapolis, MN, USA, 2007, pp. 97-104.

Z. Yu, et al., A Hybrid Learning Approach for TV Program Personalization,' The 8th International Conference on Knowledge-Based Intelligent Information & Engineering Systems (KES 2004), Lecture Notes in Computer Science, Springer-Verlag, pp. 630-636, Sep. 20-24, 2004, Wellington, New Zealand.

* cited by examiner

METHOD AND APPARATUS FOR RECOMMENDING CONTENT ITEMS

FIELD OF THE INVENTION

The invention relates to recommendation of content items and in particular, but not exclusively, to recommendation of television or radio programs.

BACKGROUND OF THE INVENTION

In recent years, the availability and provision of multimedia and entertainment content has increased substantially. For example, the number of available television and radio channels has grown considerably and the popularity of the Internet has provided new content distribution means. Consequently, users are increasingly provided with a plethora of different types of content from different sources. In order to identify and select the desired content, the user must typically process large amounts of information which can be very cumbersome and impractical.

Accordingly, significant resources have been invested in research into techniques and algorithms that may provide an improved user experience and assist a user in identifying and selecting content.

For example, Digital Video Recorders (DVRs) or Personal Video Recorders (PVRs) have become increasingly popular and are increasingly replacing conventional Video Cassette Recorders (VCRs) as the preferred choice for recording television broadcasts. Such DVRs (in the following the term DVR is used to denote both DVRs and PVRs) are typically based on storing the recorded television programs in a digital format on a hard disk or optical disc. Furthermore, DVRs can be used both for analogue television transmissions (in which case a conversion to a digital format is performed as part of the recording process) as well as for digital television transmissions (in which case the digital television data can be stored directly).

Increasingly, devices, such as televisions or DVRs provide new and enhanced functions and features which provide an improved user experience. For example, televisions or DVRs can comprise functionality for providing recommendations of television programs to the user. More specifically, such devices can comprise functionality for monitoring the viewing/recording preferences of a user. These preferences can be stored in a user preference profile and subsequently can be used to autonomously select and recommend suitable television programs for viewing or recording.

Such functionality may substantially improve the user experience. Indeed, with hundreds of broadcast channels diffusing thousands of television programs per day, the user may quickly become overwhelmed by the offering and therefore may not fully benefit from the availability of content. Furthermore, the task of identifying and selecting suitable content becomes increasingly difficult and time-consuming. The ability of devices to provide recommendations of television programs of potential interest to the user substantially facilitates this process.

In order to enhance the user experience, it is advantageous to personalize the recommendations to the individual user. The recommendation procedure includes predicting how much a user may like a particular content item and recommending it if it is considered of sufficient interest. The process of generating recommendations requires that user preferences have been captured so that they can be used as input by the prediction algorithm.

There are two main techniques used to collect user preferences. The first approach is to explicitly obtain user preferences by the user(s) manually inputting their preferences, for example by manually providing feedback on content items that the user(s) particularly liked or disliked. The other approach is to implicitly obtain user preferences by the system monitoring user actions to infer their preferences.

Explicit feedback tends to require substantial input by the user(s) and is often considered cumbersome and inconvenient by the users. This approach is therefore not ideal in the context of e.g. television viewing which is characterized by being a low effort and highly passive activity. Accordingly, it is desirable that the generation of a user preference profile or mode for the user(s) is at least partly based on implicit feedback.

Implicit preference systems acquire information indicative of user preferences by observing the user's behaviour when consuming content. A set of positive and negative preference examples is typically identified and used to train a learning algorithm which then creates a model of the user preferences. The recommendation system may then use this preference model to generate personalized recommendations.

Such mechanisms are increasingly used as part of Internet services. However, in other content consuming applications, such as television viewing, the approach tends to be less efficient as the approach is complicated by the interactions between the user and the device being more disconnected and passive than for an Internet application. Indeed, much of the information used in the Internet domain (such as click-streams, previous purchases or time spent on a particular page, etc.) are simply not available or appropriate in the television watching domain or do not provide sufficient accuracy.

However, it has been proposed to base recommendation systems for television watching applications on monitoring different user actions and interactions. For example, if a user has watched or has recorded a program then this may be considered to indicate that the user has a preference for this program. Such preference indications may be used to construct training examples for generating a user preference model.

However, much of the proposed implicit information tends to be relatively unreliable. Indeed, there are many factors that influence the user's selection of a program. For example, users will often watch programs they do not necessarily like or will miss their favourites programs. Accordingly, the training data for the user preference model is often suboptimal resulting in a suboptimal user preference model and thus in reduced accuracy of the generated recommendations.

Therefore, an improved system for content item recommendation would be advantageous. In particular, a system allowing an improved user experience, increased flexibility, reduced complexity, improved user preference models, reduced need for user inputs, improved accuracy and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a recommendation apparatus for recommending content items to at least one user, the recommendation apparatus comprising: a monitoring processor for monitoring presentation of content items; a sample processor arranged to, for a plurality of content items: determine a preference value for a presented content item in response to a first duration for a first section of the content item being presented relative to a total duration of the content item; if the first duration is less than the total duration, determining if a second section of the content item not being presented corresponds to at least one of an end section and a begin section of the content item; and if so, determining a confidence value for the preference value in response to a second duration of the second section; and a model processor for determining a user preference model in response to preference values and confidence values for the plurality of content items; and a recommendation processor for generating recommendations of content items in response to the user preference model.

The invention may allow an improved user preference model to be generated resulting in improved recommendations. Specifically, by basing a user preference model on implicit information that does not only reflect a preference value but also a confidence value of that preference value, a more accurate user preference model can be determined. In particular, the combination of determining preference values in response to the duration presented relative to the total duration and determining the associated confidence value based on the duration of a missed beginning or end section provides accurate preference information that has been demonstrated to allow more accurate user preference models and thus recommendations to be generated.

The preference value of a content item may be determined in response to a ratio of the first duration divided by the total duration. For example, the preference value may simply correspond to the ratio or may e.g. be considered as a positive preference if the ratio exceeds a specific threshold.

The plurality of content items may specifically be provided in one or more sequences of content items. For example, the content items may be content items that are broadcasted sequentially in one or more channels. Specifically, the content items may be television or radio programs.

The presentation of the content items is at least partly user controlled. For example, the user may select the content items being presented, e.g. by selecting a current channel providing real time content items and/or simply by switching the presentation on or off.

According to another aspect of the invention there is provided a method of recommending content items to at least one user, the method comprising: monitoring presentation of content items; for a plurality of content items performing the steps of: determine a preference value for a presented content item in response to a first duration for a first section of the content item being presented relative to a total duration of the content item, if the first duration is less than the total duration, determining if a second section of the content item not being presented corresponds to at least one of an end section and a begin section of the content item, and if so, determining a confidence value for the preference value in response to a second duration of the second section; and determining a user preference model in response to preference values and confidence values for the plurality of content items; and generating recommendations of content items in response to the user preference model.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a recommendation device for television programs but it will be appreciated that the invention is not limited to this application but may be applied to recommendations of many other types of content items including for example radio programs or music files.

Figure 1:
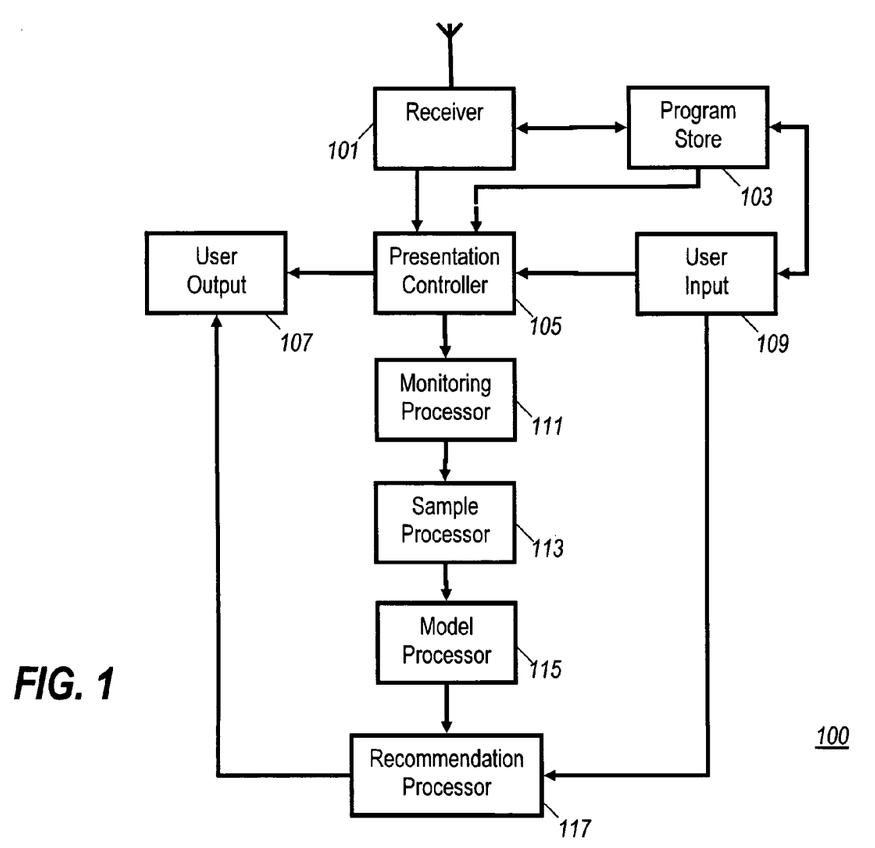
FIG. 1 illustrates an example of elements of a recommendation apparatus in accordance with some embodiments of the invention.

FIG. 1 illustrates an example of elements of a recommendation apparatus in accordance with some embodiments of the invention. In the specific example, the recommendation apparatus is a television receiver which furthermore comprises storage means for storing received television programs. For example, the recommendation apparatus may be a DVR.

The recommendation apparatus comprises a receiver 101 which receives television broadcasts from a suitable television broadcast transmitter. The receiver 101 may thus receive sequential content items corresponding to television programs in a plurality of parallel channels or streams corresponding to the different television channels.

The receiver 101 is coupled to a program store 103 in which individual programs may be stored for example in response to a user selection of programs to record.

The receiver 101 and the program store 103 are coupled to a presentation controller 105 which controls the selection and presentation of television programs. The presentation controller 105 is coupled to a user output 107 wherein the television programs can be presented to one or more users. The user output 107 may for example comprise an interface for coupling the recommendation apparatus to a conventional television or may itself e.g. comprise a display. The presentation controller 105 is further coupled to a user input 109 which may receive inputs from a user controlling the operation of the recommendation apparatus. The user input 109 may for example comprise a keyboard or a wireless interface to a remote control.

Thus, a user may provide an input to the recommendation apparatus selecting either stored or real time television programs and in response the presentation controller 105 may select the appropriate real time channel or stored television program and feed this to the user output.

It will be appreciated that although the present example describes a recommendation apparatus comprising the functionality for receiving, storing and presenting content items, some or all of this functionality may in other embodiments be external to the recommendation apparatus. For example, in some embodiments, the receiver 101, program store 103, presentation controller 105, user input 109 and user output 107 may be comprised in a DVR which is external to the recommendation apparatus. In such an example, the PVR may provide presentation information to the recommendation apparatus which may process this to generate a user preference model and recommendations as will be described in the following.

In the recommendation apparatus of FIG. 1, a user preference model is based on implicit preference information derived by monitoring characteristics of the presentations. As these are controlled by the user, the presentation characteristics may provide useful information of the user preferences. In the system, the presentation of a given program is detected and a preference value is associated therewith depending on specific presentation characteristics. These preference values may be positive and negative and accordingly a substantial number of examples of content items and associated preference values can be generated. These examples are then used as training data for generating a user preference model. Thus, in the system implicit preference information is acquired by observing user behaviours. A set of positive and negative preference examples is then constructed and used to train a learning algorithm which then creates a model of the user preferences so that the system can make personalized recommendations.

In the system, a two-step mechanism is used to infer implicit preferences. In the first step, a preference value is determined for a program based on a duration of the part of the program which has been presented relative to a total duration.

In the second step, a confidence value is calculated for the preference value dependent on a duration of a begin or end section of the program which has been missed. Specifically, the inventors have realized that the information of a start or end part being missed provides a reliable indication of the reliability and accuracy of a preference value that is based on a duration of the presentation relative to a total duration of the program. In particular, in many scenarios, the durations are related and can be used to differentiate between different examples of user behaviour reflecting different preference indications. For example the consideration may be used to differentiate between scenarios wherein the behaviour is due to a specific user preference for the program and scenarios where the behaviour is a coincidental consequence of user behaviour due to other reasons (e.g. a preference for a subsequent program).

In the system, the information of any missed section of the beginning or end of a program is then considered (potentially together with other factors) to generate a confidence value for each implicit preference being considered. Implicit preferences with low confidence values can then be discarded and not used as input for training the user preference model. As another example, the confidence values can be used to determine the impact that the different implicit preference examples should have on the user preference model so that examples with less reliability have less impact than those with more reliability. Furthermore, if there is a set of examples relative to the same program, the confidence values can be used to determine which examples should be taken into account (selective approach) or how the implicit preference value for this particular example should be calculated (combination approach).

The use of both preference values and closely related confidence values allows a more accurate user preference model to be generated thereby resulting in improved recommendations. Furthermore, the specific characteristics being considered for the preference and confidence values provide particularly useful and accurate information resulting in an improved accuracy of the user preference model and of the generated recommendations.

In the example, the presentation controller 105 is coupled to a monitoring processor 111 which monitors the presentation of programs by the presentation controller 105. Specifically, for each fully or partially presented television program, the monitoring processor 111 retrieves information relating to the program from the presentation controller 105. This information may include characterizing data that describes the content item. This data may be meta-data describing e.g. a title, genre, description, total duration, etc of the program. In addition, the information includes data describing the duration and specific timing of the section that has been presented. The monitoring processor 111 then feeds this information to the sample processor 113 which proceeds to generate a training example for the content item. The training example comprises characterizing data describing the program as well as a preference value and an associated confidence value.

It will be appreciated that the functionality of the presentation controller 105 and the monitoring processor 111 will be integrated in many practical embodiments.

The sample processor 113 accordingly first determines a preference value for the television program in response to the duration of the presented section of the program relative to the total duration of the program.

The preference value (p) is defined as a function f of the duration of the presented section ($d_w$) and the duration of the program ($d_p$) (in order to compensate for programs having different lengths):

$$p = f_p(d_w, d_p)$$

As an example, if the user selects to be presented more of the program than a given threshold ($t_p$), the program is considered as a positive preference example and otherwise it is considered a negative preference example, e.g.:

$$f_p(d_w, d_p) = \begin{cases} \text{'liked'} & \text{if } \frac{d_w}{d_p} > t_p \\ \text{'disliked'} & \text{otherwise} \end{cases}$$

In a more complex embodiment, the preference value may be (e.g. linearly) linked to the actual amount of the program that the user has watched, e.g:

$$f_p(d_w, d_p) = \frac{d_w}{d_p}$$

In a second step, the sample processor 113 then proceeds to determine a confidence value which is dependent on a duration of a beginning or end section that has not been presented (if any). Thus, the sample processor 113 may first determine if the whole program has been presented. If so, the confidence value may be set to a high value. However, if only part of the program has been presented, the sample processor 115 may determine whether a beginning section or an end section has been missed. If so, the confidence value may be set dependent on the duration of this section.

For example, a positive preference value may be determined for a program for which 95% has been presented. If the missing 5% were at the start of the program, it is relatively likely that the user possibly selected the program randomly and then liked it sufficiently to watch the entire remaining part of the program. Accordingly, the confidence value for the positive preference value is set to a high value. However, if the last 5% was missed, this indicates that the user may not like the program enough to watch it to completion. However, it may also be due to the user being unable to continue to watch the program due to other commitments. Thus, it is less likely that the positive preference value actually reflects the user's underlying positive preference value for the underlying concept and accordingly the confidence value is set to a lower value.

Thus, the sample processor 113 may generate a user preference example with a preference value and associated confidence value for some or all programs that is (partially or fully) presented to the user with the values reflecting the amount of the program that has been presented.

The user preference examples are then fed to a model processor 115 which proceeds to use these examples as training data for a learning algorithm that generates a user preference model reflecting the user(s) preferences. Thus, the model processor 115 generates the user preference model in response to the preference values and confidence values for the programs (as well as the characterizing data).

It will be appreciated that many different algorithms and approaches for generating a user preference model based on training data is known to the skilled person and that any suitable method may be used. For example, the model processor 115 may initially discard all examples having a confidence value less than a given threshold and then use the remaining examples as training data for a learning algorithm considering only preference values and characterizing data.

As an example, the model processor 115 may generate the user preference model by using a probabilistic approach such as e.g. a naïve Bayes classifier (ref. e.g. http://en.wikipedia.org/wiki/Naive_Bayes_classifier).

The model processor 115 is coupled to a recommendation processor 117 which is arranged to generate recommendations for television programs using the user preference model generated by the model processor 115. It will be appreciated that many different methods and algorithms for generating recommendations based on a user preference model will be known to the skilled person and that any suitable approach may be used without detracting from the invention.

In the example of FIG. 1, the recommendation processor 117 is coupled to the user input 109 and the user output 107, and may generate recommendations and present them via the user output 107 in response to e.g. receiving a user generated recommendation request from the user input 109.

Thus the recommendation apparatus of FIG. 1 may generate recommendations with improved accuracy based on a more accurate user preference model. The user preference information comprises both preference and confidence values based on specific and correlated characteristics that provide improved implicit indications of user preferences. Furthermore, the user preference information is based on the presentations selected by the user rather than e.g. on the selection of programs to record. This may provide improved accuracy as the fact that a user records a program is not an indication that the user necessarily likes it. In the system, the preference example is only generated if the user actually selects the program to be presented (whether this is a live real time program or a previously recorded program) thereby reflecting a specific interest or preference.

In some embodiments and scenarios, the sample processor 113 may detect that an end section of a program has been missed and the confidence value may be set dependent on the duration of this missed section.

For example, if a user finds a program that he/she begins to watch, he/she is likely to watch this to the end if it meets his/her preferences. On the other hand, if the user is not enjoying the program it is likely that he/she will switch to something else long before the program ends. Accordingly, if the determined preference is indicative of a positive preference, the confidence of this preference is higher for lower durations of any missed end section. Conversely, if the preference value is indicative of a negative preference, the higher the duration of the missing end section, the higher the confidence that the user does not have a preference for the program. Thus, the confidence value may be set higher.

In the system of FIG. 1, the sample processor 113 biases the confidence value towards an indication of a reduced confidence if the preference value is indicative of a negative preference and the duration of the missed section is higher than a threshold. Also, the sample processor 113 biases the confidence value towards an indication of an increased confidence if the preference value is indicative of a positive preference and the second duration is lower than a threshold.

Hence, in the example, the confidence value is set both in response to the duration of the missed section but also in dependence on the preference value itself. In particular, a bias of the confidence value may be in one direction (e.g. higher confidence value) for a positive preference value and in the other direction (e.g. lower confidence value) for a negative preference value (or vice versa).

The confidence value may specifically be determined by evaluating the duration of the watched duration and the duration of the missed section relative to various thresholds. For example, a confidence value may be determined as:

$$c = \begin{cases} 100 & \text{if } \frac{d_w}{d_p} > 0.9 \text{ and } \frac{d_m}{d_p} < 0.05 \text{ OR if } \frac{d_w}{d_p} < 0.8 \text{ and } \frac{d_m}{d_p} > 0.05 \\ 0 & \text{otherwise} \end{cases}$$

where $d_w$ represents the duration of the presented section, $d_p$ represents the duration of the program and $d_m$ represents the duration of the missed end section.

If the sample processor 113 detects that a beginning section of a program has been missed, the confidence value may alternatively or additionally be set dependent on the duration of this missed section. Specifically, the sample processor 113 of FIG. 1 biases the confidence value towards an indication of reduced confidence if the duration of the start section being missed is higher than a threshold.

This can accurately reflect that if a user starts watching a program that has started sometime ago, the user may be more inclined not to watch it even if of interest to the user. In fact, if the user notices a program which is half-way through, they may often decide not to watch it for this reason even if they have a high preference for the program. Indeed, it may even be because they have a high preference for the program that they decide not to watch it but rather to wait for a repeat transmission allowing them to watch it in full. Thus, for a program that has only been partially watched but where the start has been missed, it will typically be uncertain whether this is due to the user having a low preference or whether it is due to the start being missed. Accordingly, although a low preference value may be determined to reflect that only a relatively small part of the program has been watched, the confidence value for this indication may be set low.

In the example, the confidence value for a given program is determined by considering a number of different aspects. For example, a contribution may be determined by considering the duration presented, a second contribution may be determined from a duration of any missed start section and a third contribution may be determined from a duration of any missed begin section. In some embodiments, other characteristics may also be considered and provide a contribution as will be described later.

In the example, the confidence value c for a program may be determined as a function of the individual contributions:

$$c = f_c(I)$$

In the example each of these contributions is determined as a numerical value, v, which may be positive (biasing the confidence value towards a higher confidence) or negative (biasing the confidence value towards a lower confidence) and the confidence value for the program is determined as the sum of the individual contributions:

$$f_c(I) = \sum_{i \in I} v_i$$

The confidence value may then e.g. be used to either filter out examples with low reliability from the training set or may be used to determine the impact that each example should have on the construction of the user preference model (e.g. to determine a weighting of each example in the training process).

Thus, in some embodiments, the model processor 115 can generate a training set for training the user preference model which includes all the examples having confidence values that are above a given threshold. This may provide an improved accuracy of the generated user preference model.

In some embodiments, a more complex approach may be used wherein the significance of each example when training the user preference model is dependent on the confidence value. Thus, the higher the confidence value, the higher the impact of the example on the model. For example in a probabilistic approach, the features of each example may be weighted by the confidence for the example.

In some embodiments, some of the content items are duplicates of each other. For example, the same program (e.g. film) may be repeated a number of times. In such examples, the preference information for the duplicates may be combined to facilitate and improve the generation and training of the user preference model. It will be appreciated that any suitable similarity criterion may be used to determine if content items are duplicates. For example, two television programs may be considered to be duplicates if they have the same title and a length which is within, say, 10% of each other.

The model processor 115 can specifically combine the duplicate preference information into a single preference example. Thus, specifically a combined preference value can be generated for all the duplicate programs. The preference value may for example be generated as an average preference value for the duplicate examples. Similarly, a single confidence value may be generated e.g. by averaging the confidence values of the different duplicates.

However, in some embodiments, the combined preference value is generated in response to the confidence values of the duplicates. For example, the model processor 115 may discard all preferences that have a value below a given threshold (and e.g. average the rest) or may simply select the preference value corresponding to the highest confidence value.

Thus, the confidence value is useful in dealing with duplicate (and possibly inconsistent) preference examples that may appear in the training set. For instance, a user may have almost entirely watched a program on one day but barely half or none of it on another day. Selecting the preference examples with the highest confidence helps to easily solve this conflict. So considering that there are n examples regarding the same user and program that have preference values $p_1$, $p_2, \ldots p_n$ and confidence values $c_1, c_2, \ldots, c_n$, the system can e.g. combine those into a single example with preference p and confidence c such that:

$$p = p_i, c = c_i: i = \underset{1 \leq i \leq n}{\mathrm{argmax}} c_i$$

Also, the preference value itself can be used when combining. For example, the highest preference value may be selected corresponding to a reasoning that if the user has watched the program fully at least once, then he/she must like it. Another alternative is to have the different ratings combined taking into account their relative reliability:

$$p = \frac{\sum_{i=0}^{n} c_i p_i}{\sum_{i=0}^{n} c_i} p_i, c = \frac{\sum_{i=0}^{n} c_i c_i}{\sum_{i=0}^{n} c_i}$$

Experiments have been performed to demonstrate and evaluate the benefits that may be achieved by the described two stage approach generating a preference value based on the duration of a presented section and a confidence value dependent on this duration and a duration of any missed begin or end sections.

In particular four different approaches have been evaluated using the same recommendation algorithm but with different training sets. The training sets are made up by implicit preference examples that meet different requirements.

Experiment 1 is referred to as IP0 and is a reference example that simply generates a positive preference if a user is presented with at least 90% of a program and a negative preference otherwise. No confidence value is generated and all examples are included in the preference set.

Experiment 2 is referred to as IP1 and uses the same preference value as IP0. However, a confidence value is set to +100 if the duration watched is above 90% and to +50 if the duration watched is below 10%. All other confidence values are set to zero. All examples having a confidence values of zero or below are then removed from the training set.

Experiment 3 is referred to as IP2 and uses the same preference value as IP0 and IP1. However, a confidence value contribution is set to +100 if the duration watched is above 90%, to +50 if the duration watched is below 10% and to −50 if the duration of a missed end section is less than 10%. The confidence value for an example is then determined by summing the individual confidence value contributions (and setting the value to zero if there are no suitable contributions). All examples having a confidence value of zero or below are then removed from the training set.

Experiment 4 is referred to as IP3 and uses the same preference value as IP0, IP1, and IP2. A confidence value contribution is set to +100 if the duration watched is above 90%, to +50 if the duration watched is below 10%, and to −50 if the duration of a missed start section is less than 10%. The confidence value for an example is then determined by summing the individual confidence value contributions (and setting the value to zero if there are no suitable contributions). All examples having a confidence value of zero or below are then removed from the training set.

Thus the training sets of the individual experiments may be summarized by:

| Exp. | Positive examples | Negative examples | Discarded examples |
|---|---|---|---|
| IP0 | Percentage watched is at least 90% | Percentage watched is less than 90% | None |
| IP1 | Percentage watched is at least 90% | Percentage watched is less than 10% | Percentage watched is more than 10% and less than 90% |
| IP2 | Percentage watched is at least 90% | Percentage watched is less than 10% and percentage missed at the end is more than 10% | All other |
| IP3 | Percentage watched is at least 90% | Percentage watched is less than 10% and percentage missed at the start is less than 90% | All other |

Three different metrics have been used to evaluate the "quality" of the recommendations. These are:

| Evaluation metric | Definition |
|---|---|
| Precision | Measures the proportion of items in the recommendations that actually match user preferences. |
| Recall | Measures the proportion of items that match user preferences which have actually been included in the recommendation list. |
| Breese Score | It measures how well sorted the recommendation list is (i.e., whether the most relevant items are being presented first), as defined in Breese, J., Heckerman, D., and Kadie, C. Empirical analysis of predictive algorithms for collaborative filtering. In Proceedings of the Fourteenth Annual Conference on Uncertainty in Artificial Intelligence (Madison, WI, USA, July 1998), Morgan Kaufmann, pp. 43-52. |

The results obtained for the different experiments are:

| Experiment | Precision | Recall | Breese score |
|---|---|---|---|
| IP0 | 0.63 ± 0.09 | 0.37 ± 0.07 | 0.47 ± 0.10 |
| IP1 | 0.86 ± 0.06 | 0.43 ± 0.07 | 0.51 ± 0.09 |
| IP2 | 0.91 ± 0.05 | 0.42 ± 0.07 | 0.51 ± 0.09 |
| IP3 | 0.91 ± 0.05 | 0.43 ± 0.07 | 0.51 ± 0.09 |

As can be seen, the performance and in particular the precision, is improved for experiments IP2 and IP3 which clearly demonstrate that there is a clear benefit in discarding the least reliable examples determined on the basis of the durations of missed start and end sections.

Another set of experiments has been performed with the same dataset but aiming at addressing the issue of inconsistent duplicate preference examples. Using the following confidence rules, the system only kept the preference example with highest confidence in case of redundancy (specifically programs with the same program title):

If percentage watched p is above 90%, confidence is set to (p−90)+10.

If percentage watched is below 10%, confidence is set to (10−p).

All other examples have confidence set to 0.

In case there are two or more preference examples for the same program, the preference value with the highest confidence value is kept with other examples being discarded.

Figure 2:
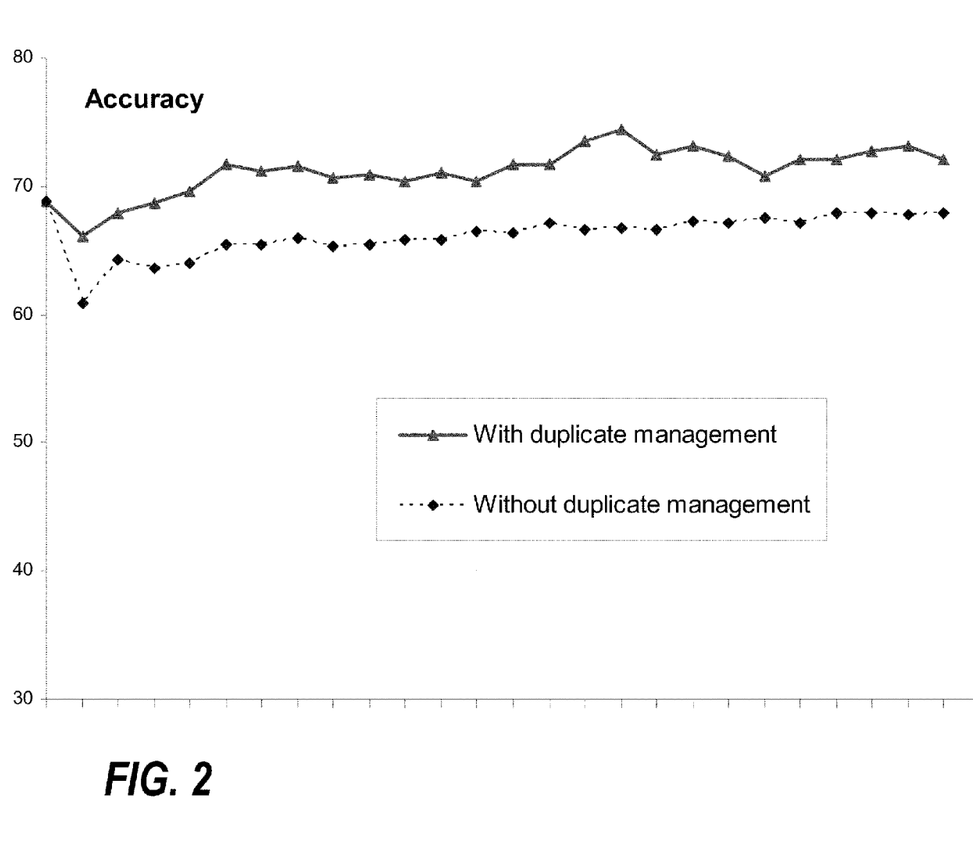
FIG. 2 illustrates an example of a performance comparison for a recommendation apparatus in accordance with some embodiments of the invention.
Figure 3:
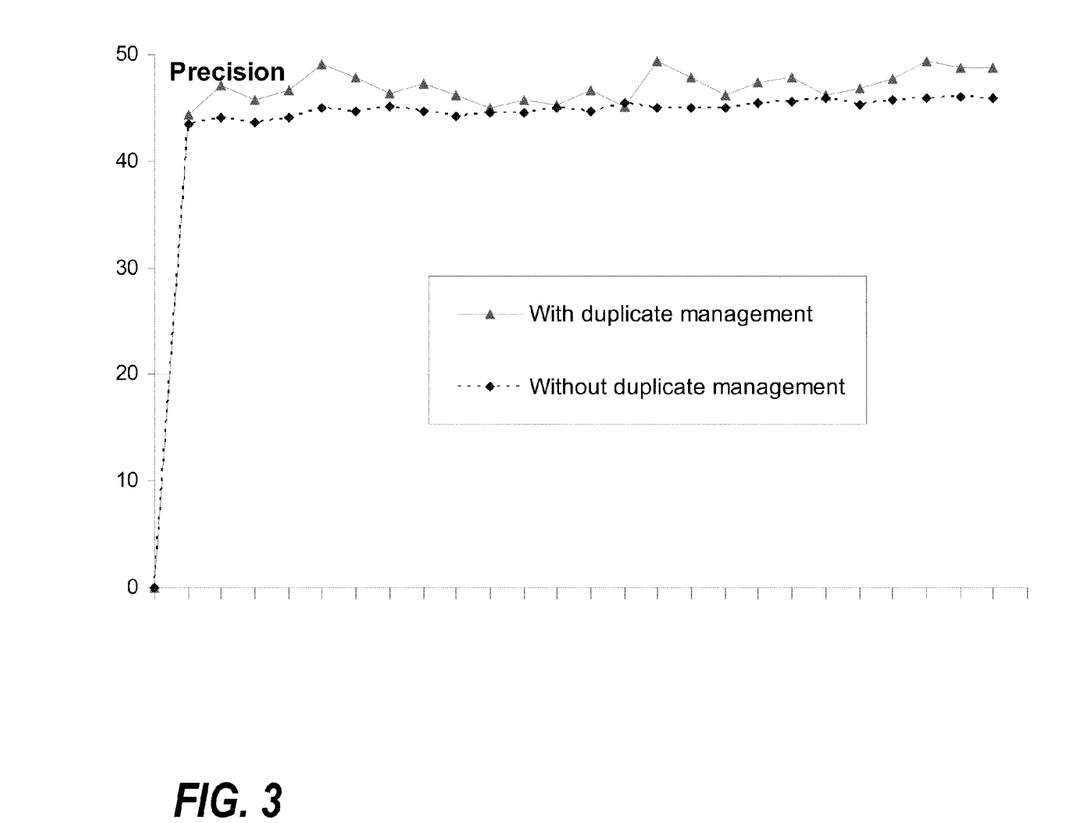
FIG. 3 illustrates an example of a performance comparison for a recommendation apparatus in accordance with some embodiments of the invention.

The results are shown in FIGS. 2 and 3 which clearly demonstrate an improvement (about 6%) both in precision and accuracy.

As previously mentioned, the confidence value may take into account a number of other factors and characteristics. Each of these may for example provide a contribution I which is combined with other contributions to generate the confidence value, e.g. by a simple summation of numeric contributions, v:

$$f_c(I) = \sum_{i \in I} v_i$$

For example, in some embodiments the sample processor 113 may generate a contribution in response to a time elapsed since a previous user input. Thus, the recommendation apparatus may detect how long it has been since a user input was last received and may use this to set the confidence value. For example, it is often the case that a television is left on by itself or is used as background noise. This may be differentiated to a more active user selection and reflected in the confidence value. Specifically, preference examples that are very distant to a user action will be given a lower confidence.

In some embodiments the sample processor 113 may generate a contribution in response to a duration of a presentation of a following content item relative to a total duration of a following content item.

For example, if the following program is watched in its entirety whereas only the last section of the current program is watched, this may be due to the user simply watching the end of the current program while waiting for the next program to start. Accordingly, the confidence value (of either a negative or positive preference value) may be reduced to reflect that the current user action is more related to the following program than the current program.

In some embodiments the sample processor 113 may generate a contribution in response to the presentation time for the content item relative to a presentation time preference profile for the at least one user.

For example, the content item may be a real time content item which has not been stored. For example, it may be a broadcast content item, such as a television program, and should therefore be watched in real time. If this time is outside the user's normal time for watching television, the confidence value may be set higher for a positive preference value and lower for a negative preference value as it indicates that the user has made a special effort to consume the program. Thus, the perceived inconvenience of the program's time slot can be taken into account when determining the confidence value.

In some embodiments the sample processor 113 may generate a contribution in response to at least one other simultaneous real time content item. For example, two programs may be broadcast at the same time and the user may actively select which of these to watch.

Specifically, when a user is watching a program on television it may be possible to assume that he/she prefers this program to other programs being aired simultaneously on other channels. This assumption is particularly valid if the person has zapped through the other channels previously. If a program has been skipped and the user spends its duration watching something else, then it is safe to assume that this is not a favourite and this may be taken into account when determining the confidence value.

In some embodiments the sample processor 113 may generate a contribution in response to a similarity measure for a group of users being presented the content item.

For example, the recommendation apparatus may comprise functionality for individual users to log-on and off thereby providing information of which users are currently consuming the presented content. The characteristics of the individual users may be pre-stored in the apparatus. For example, upon initialization, the users may provide information on age, gender, etc to the recommendation apparatus and subsequently the operation of the recommendation apparatus may be personalized to the specific group of users currently logged-on.

The more different the current viewers are (e.g. age groups, genders) the less likely the program is to be an individual preference of any one viewer. Thus, the confidence value for a preference value for an individual user may be reduced if the preference value is generated for a program that is viewed by a diverse group of users.

In some embodiments the sample processor may generate a contribution in response to the frequency of associated/similar content items. For example, for a television application, television programs may be frequently repeated or frequent programs of a series may be transmitted. In such a system, the sample processor may take into account the ratio of positive viewing examples to viewing opportunities. E.g. users may have a strong preference for a type of content which is only infrequently transmitted and therefore is only infrequently represented by an example being generated. In contrast, the user may have less preference for a program which has more examples due to it frequently being transmitted. Accordingly, a small number to positive viewing examples might have more significance than the same amount of positive examples for types of content which are broadcast everyday. The sample processor may take this into account, e.g. by reducing the confidence value for programs that are frequently transmitted.

It will be appreciated that any suitable similarity criterion may be used. For example, programs may be considered to be associated or similar if they are indicated to belong to the same series (e.g. all episodes of a sitcom series may be considered to the similar).

It will be appreciated that other factors or characteristics may also be considered and provide a contribution to the confidence value. For example, the following factors can be considered:

| | |
|---|---|
| Live-viewing or time-shifted viewing | Preference examples linked to recorded programs may be given higher confidence due to the extra investment involved in recording the program. |
| Number of interruptions | The most captivating programs are often watched in one go (except maybe for ad breaks). Conversely, boredom can easily be a trigger to temporarily interrupt viewing and switch to other channels to find something more interesting to watch. So if a program viewing is repeatedly interrupted by zapping, it is probably because the user interest is not high. |
| Pausing a channel | If during the viewing of a program this is paused (typically, the program is recorded so that it its viewing can be resumed later from the same point) then this can be seen as an indication of special preference for this program. Most probably, the user had to make an interruption and wants to make sure he/she does not miss any part of the program. |
| Upgrading of repetitive instances of positive examples | Users who repeatedly watch an anticipated program at the same time each week in a pattern, are likely to have a stronger preference for that program than a program they have watched the same amount of times, but in an irregular opportunist fashion (e.g. when they happened to notice it was being broadcast). |

Figure 4:
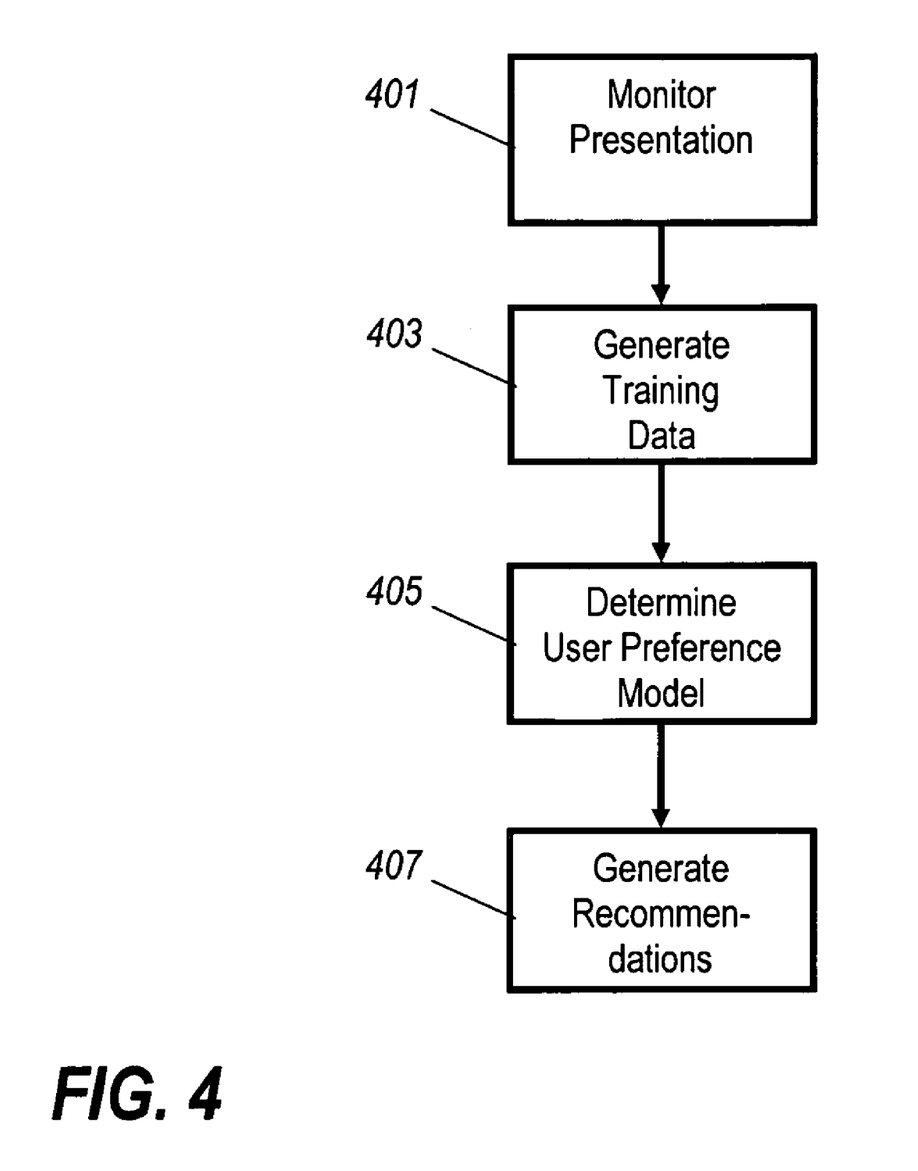
FIG. 4 illustrates a method of recommending content items to at least one user in accordance with some embodiments of the invention.

FIG. 4 illustrates a method of recommending content items to at least one user in accordance with some embodiments of the invention.

The method initiates in step 401 wherein presentations of content items is being monitored.

Step 401 is followed by step 403 wherein a preference value and confidence value is determined for each content item of a plurality of content items. The values are determined by performing the steps of: determining a preference value for a content item presented by the presentation unit in response to a first duration for a first section of the content item being presented relative to a total duration of the content item, if the first duration is less than the total duration, determining if a second section of the content item not being presented corresponds to at least one of an end section and a begin section of the content item, and if so determining a confidence value for the preference value in response to a second duration of the second section.

Step 403 is followed by step 405 wherein a user preference model is determined in response to preference values and confidence values for the plurality of content items.

Step 405 is followed by step 407 wherein recommendations of content items are generated in response to the user preference model.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A recommendation apparatus for recommending content items to at least one user, the recommendation apparatus comprising:
  a monitoring processor for monitoring presentation of content items;
  a sample processor arranged to, for a plurality of content items:
    determine a preference value for a presented content item in response to a first duration for a first section of the content item being presented relative to a total duration of the content item;
    if the first duration is less than the total duration, determining if a second section of the content item not being presented corresponds to at least one of an end section and a begin section of the content item; and
    if so, determining a confidence value for the preference value in response to a second duration of the second section; and
  a model processor for determining a user preference model in response to preference values and confidence values for the plurality of content items; and
  a recommendation processor for generating recommendations of content items in response to the user preference model.

2. The recommendation apparatus of claim 1 wherein the sample processor is further arranged to determine the confidence value in response to the first duration.

3. The recommendation apparatus of claim 2 wherein the sample processor is arranged to further determine the confidence value in response to the preference value.

4. The recommendation apparatus of claim 1 wherein the second section corresponds to the end section.

5. The recommendation apparatus of claim 4 wherein the sample processor is arranged to bias the confidence value towards an indication of a reduced confidence if the preference value is indicative of a negative preference and the second duration is higher than a threshold.

6. The recommendation apparatus of claim 4 wherein the sample processor is arranged to bias the confidence value towards an indication of an increased confidence if the preference value is indicative of a positive preference and the second duration is lower than a threshold.

7. The recommendation apparatus of claim 1 wherein the second section corresponds to the begin section.

8. The recommendation apparatus of claim 7 wherein the sample processor is arranged to bias the confidence value towards an indication of reduced confidence if the second duration is higher than a threshold.

9. The recommendation apparatus of claim 1 wherein the model processor is arranged to adjust an impact of each preference value on the user preference model in response to a confidence value for the preference value.

10. The recommendation apparatus of claim 1 wherein the model processor is arranged to generate a training set of content items as a subset of the plurality of content items selected in response to the confidence values; and to generate the user preference model in response to the training set.

11. The recommendation apparatus of claim 1 wherein the model processor is arranged to generate a combined preference value for a group of content items corresponding to duplicate content items in response to confidence values for content items of the group of content items.

12. The recommendation apparatus of claim 11 wherein the model processor is arranged to discard preference values of content items of the group of content items having a confidence value below a threshold.

13. The recommendation apparatus of claim 11 wherein the model processor is arranged to determine the combined preference value as a highest confidence value for the group of content items.

14. The recommendation apparatus of claim 1 wherein the sample processor is further arranged to determine the confidence value in response to a time elapsed since a previous user input.

15. The recommendation apparatus of claim 1 wherein the sample processor is further arranged to determine the confidence value in response to a duration of a presented section a following content item relative to a total duration of a following content item.

16. The recommendation apparatus of claim 1 wherein the sample processor is further arranged to determine the confidence value in response to a presentation time for the content item relative to a presentation time preference profile for the at least one user.

17. The recommendation apparatus of claim 1 wherein the content item is a real time content item and the sample processor is further arranged to determine the confidence value in response to at least one other simultaneous real time content item.

18. The recommendation apparatus of claim 1 wherein the sample processor is further arranged to determine the confidence value in response to a similarity measure for a group of users being presented the content item.

19. The recommendation apparatus of claim 1 further comprising means for receiving the plurality of content items from a broadcast; and wherein the sample processor is arranged to determine the confidence value in response to a frequency in the broadcast of content items matching a similarity criterion for the content item.

20. A method of recommending content items to at least one user, the method comprising:
  monitoring presentation of content items;
  for a plurality of content items performing the steps of:
    determine a preference value for a presented content item in response to a first duration for a first section of the content item being presented relative to a total duration of the content item, if the first duration is less than the total duration, determining if a second section of the content item not being presented corresponds to at least one of an end section and a begin section of the content item, and
if so, determining a confidence value for the preference value in response to a second duration of the second section; and
determining a user preference model in response to preference values and confidence values for the plurality of content items; and
generating recommendations of content items in response to the user preference model.

* * * * *